United States Patent
Hammer et al.

(10) Patent No.: US 7,051,939 B2
(45) Date of Patent: May 30, 2006

(54) BAR CODE SCANNER WITH LASER BEAM OSCILLATOR

(75) Inventors: Steven J. Hammer, Lilburn, GA (US); Wayne L. Orwig, Dacula, GA (US)

(73) Assignee: NCR Corporation, Dayton, OH (US)

( * ) Notice: Subject to any disclaimer, the term of this patent is extended or adjusted under 35 U.S.C. 154(b) by 39 days.

(21) Appl. No.: 10/862,805

(22) Filed: Jun. 7, 2004

(65) Prior Publication Data

US 2005/0269413 A1    Dec. 8, 2005

(51) Int. Cl.
   *G06K 7/10*    (2006.01)

(52) U.S. Cl. .............................. 235/462.39; 235/462.25

(58) Field of Classification Search ..............................
   235/462.01–462.47, 472.01, 472.02, 472.03, 235/454, 455, 494, 470
   See application file for complete search history.

(56) References Cited

U.S. PATENT DOCUMENTS

| | | | | |
|---|---|---|---|---|
| 4,006,343 A | * | 2/1977 | Izura et al. ................. | 235/470 |
| 4,501,962 A | * | 2/1985 | Luck, Jr. ................... | 250/201.4 |
| 4,998,259 A | * | 3/1991 | Chandra et al. ............... | 372/68 |
| 5,223,700 A | * | 6/1993 | Takenaka ................ | 235/462.39 |
| 5,365,049 A | * | 11/1994 | Peng ...................... | 235/462.22 |
| 6,177,979 B1 | * | 1/2001 | Oliva .......................... | 355/53 |
| 6,230,976 B1 | * | 5/2001 | Sautter et al. ......... | 235/462.36 |
| 6,910,633 B1 | * | 6/2005 | Swartz et al. .......... | 235/472.01 |
| 2001/0054678 A1 | * | 12/2001 | Takada .................... | 250/208.1 |
| 2004/0007679 A1 | * | 1/2004 | Viviani ................. | 250/492.21 |
| 2005/0001034 A1 | * | 1/2005 | He .............................. | 235/454 |
| 2005/0141069 A1 | * | 6/2005 | Wood et al. ................ | 359/196 |

* cited by examiner

*Primary Examiner*—Thien M. Le
(74) *Attorney, Agent, or Firm*—Paul W. Martin

(57) ABSTRACT

A bar code scanner with laser beam oscillator which rasters a laser beam to produce more scan line coverage. The bar code scanner includes a laser for producing a laser beam, a mirrored spinner, and a laser beam oscillator optically located between the laser and the mirrored spinner for continuously deflecting the laser beam about an undeflected path of the laser beam.

20 Claims, 5 Drawing Sheets

BAR CODE SCANNER WITH LASER BEAM OSCILLATOR

BACKGROUND OF THE INVENTION

The present invention relates to bar code readers and more specifically to a bar code scanner with laser beam oscillator.

Bar code readers are well known for their usefulness in retail checkout and inventory control. They are typically connected to a point-of-sale (POS) terminal, along with other peripherals.

Typical bar code scanners generally have very good throughput on easy to read bar code labels. What separates the exceptional scanners is the ability to read difficult bar code labels such as small, poorly printed, low contrast, wrinkled, Reduced Space Symbology (RSS), and two-dimensional (2D) bar code labels. Because most scanners have a distinct, stationary scan pattern with a finite number of scan lines, the probability of the lines locating and reading these difficult bar code labels may be quite low. Furthermore, a raster scan pattern is required to be able to read the new 2D bar code labels.

Therefore, it would be desirable to provide a bar code scanner that is capable of reading a wide variety of bar code labels.

SUMMARY OF THE INVENTION

In accordance with the teachings of the present invention, a bar code scanner with laser beam oscillator is provided.

The bar code scanner includes a laser for producing a laser beam, a mirrored spinner, and a laser beam oscillator optically located between the laser and the mirrored spinner for continuously deflecting the laser beam about an undeflected path of the laser beam.

It is accordingly an object of the present invention to provide a bar code scanner with laser beam oscillator.

It is another object of the present invention to provide a bar code scanner capable of reading a wide variety of bar code labels, including small, poorly printed, low contrast, wrinkled, Reduced Space Symbology (RSS), and two-dimensional (2D) barcode bar code labels.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
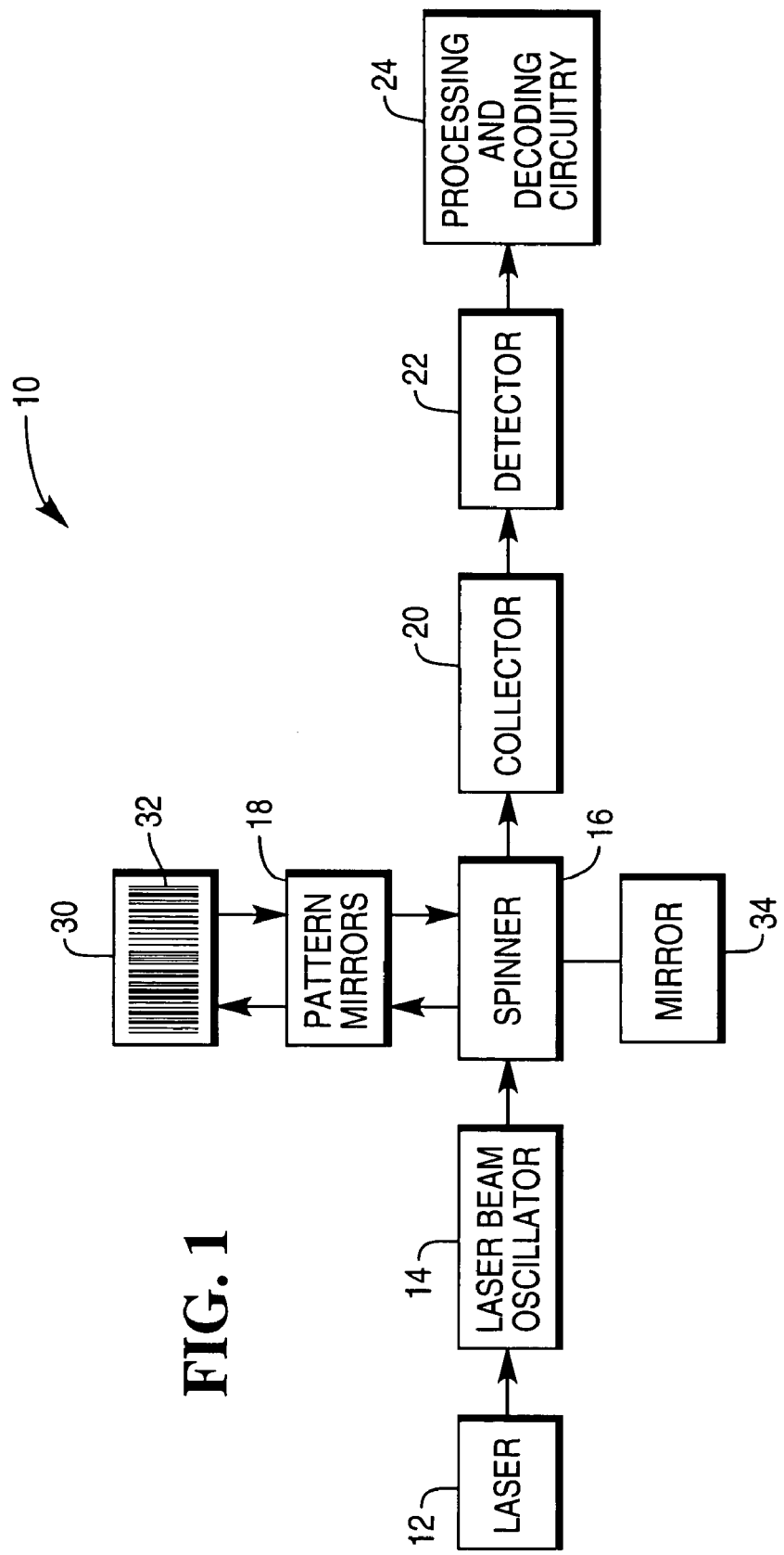
FIG. 1 is a block diagram of a bar code scanner.

Referring now to FIG. 1, bar code reader 10 includes laser 12, laser beam oscillator 14, spinner 16, pattern mirrors 18, collector 20, and detector 22.

Laser 12 produces a laser beam. Laser 12 preferably includes a laser diode, and may additionally include a focusing lens or lenses, and a collimating aperture for directing the laser beam along a path from laser 12.

Laser beam oscillator 14 deflects the laser beam from its undeflected path. Laser beam oscillator 14 continuously varies the angle of the laser beam to generate groups of raster scan patterns containing an infinite number of scan lines about original stationary scan lines. This raster effect causes the scan lines to fill much more of the exit window, making detection and reading of bar code labels easier. This raster effect also allows scanner 10 to read two-dimensional bar code labels. The substantial increase in pattern density allows scanner 10 to read truncated bar code labels and Reduced Space Symbology (RSS) bar code labels.

Advantageously, deflection of the laser beam prior to spinner 16, as opposed to after spinner 16, requires much less power, space, and cost, and is more reliable.

Spinner 16 directs the oscillating laser beam to pattern mirrors 18. Spinner 16 preferably includes planoreflective mirrored surfaces oriented at different angles to produce a plurality of different oscillating scanning beams from the oscillating laser beam. Spinner 16 additionally directs light reflected from item 30 to collector 20. Spinner 16 is rotated by motor 34.

Pattern mirrors 18 direct oscillating scanning beams from spinner 16 to create oscillating scan lines for scanning item 30. Pattern mirrors 18 also direct the light reflected from item 30 to spinner 16.

Pattern mirrors 18 preferably include a plurality of flat mirrors arranged in different positions and different orientations so as to create a plurality of different oscillating scan lines that scan item 30 from a plurality of different directions.

Collector 20 collects the light reflected from item 30 and directs it to detector 22. Collector 20 may include a focusing mirror or lens.

Detector 22 converts the light reflected from item 30 into electrical signals.

Processing and decoding circuitry 24 processes the electrical signals, converts the electrical signals to digital signals, and decodes the digital signals to produce bar code information associated with bar code 32.

Figure 2:
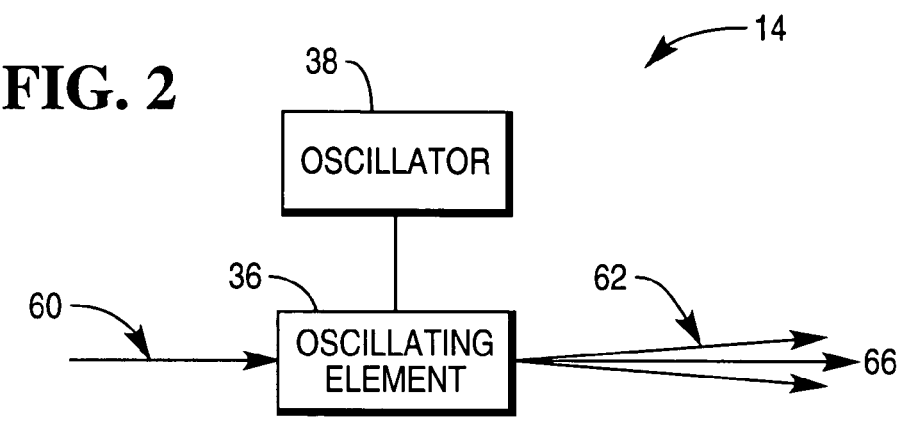
FIG. 2 is a block diagram of a laser beam oscillator.

Turning now to FIG. 2, laser beam oscillator 14 includes oscillating element 36.

Oscillating element 36 rotates, translates, tilts, or otherwise deflects laser beam 60 from laser 12 about an undeflected path 66 to produce a variable scan pattern. Oscillating element 36 may include a window flat, wedge, prism, mirror, piezoelectric device, acousto-optical beam deflector, diffractive beam deflector, or any other optical element that would produce a rotation or linear translation of laser beam 60 about its undeflected path 66.

Oscillator 38 causes oscillating element 36 to rotate, translate, or tilt. Oscillator 38 may include a motor or propeller driven by windage from spinner 16. Oscillator 38 may also include a piezoelectric device, a galvanometer, an acousto-optical device, or a voice coil.

Figure 3:
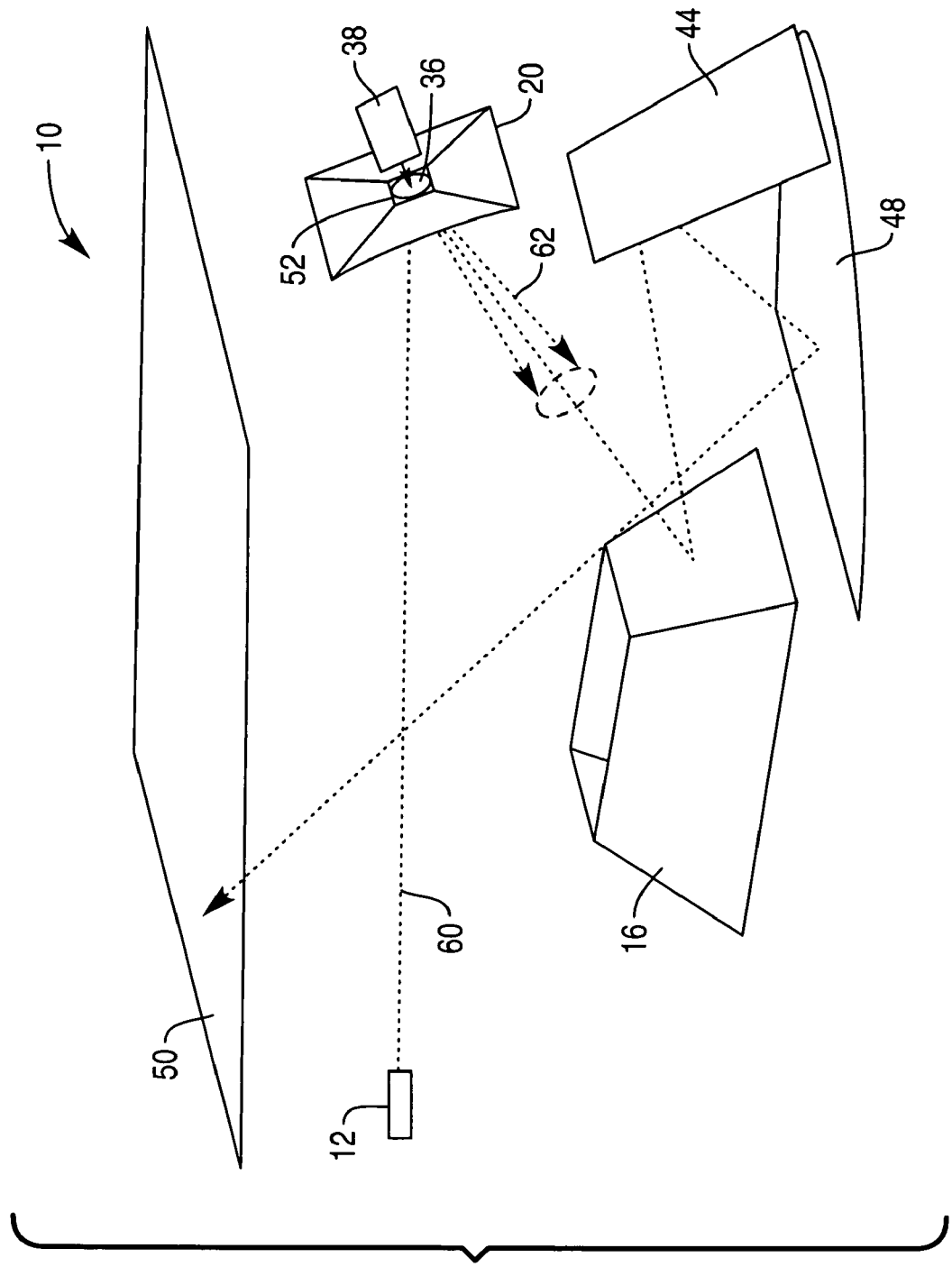
FIG. 3 is a diagrammatic view of the bar code scanner illustrating operation of the laser beam oscillator.

With reference to FIG. 3, an example embodiment of bar code reader 10 is illustrated in more detail.

Oscillating element 36 includes a flat mirror and oscillator 38 includes a motor.

Oscillating element 36 oscillates and reflects laser beam 60 towards spinner 16. Oscillating element 36 is mounted within aperture 52 of collector 20.

Pattern mirrors 44 and 48 direct oscillating laser beam 62 along a ray path from spinner 16 through window 50.

Figure 4:
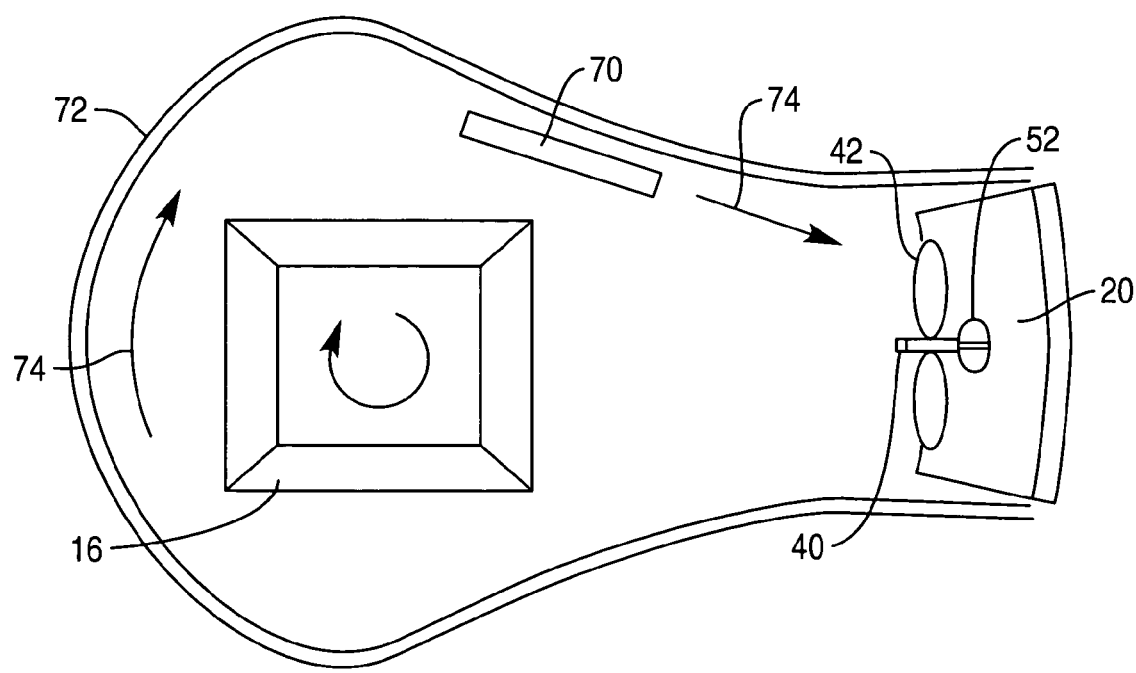
FIG. 4 is a diagrammatic view of an alternative oscillator for the laser beam oscillator.

With reference to FIG. 4, oscillator 38 may include a propeller to eliminate the cost, power consumption, and reliability issues of a second motor. The propeller is driven by windage 74 from spinner 16. Wall 72 creates a channel which directs windage 74 to airflow tube 70. Airflow tube 70 directs windage 74 to the propeller. Oscillating element 36 is mounted to the hub of the propeller.

Turning now to FIGS. 5A–5D, operations of various optical elements used as oscillating element 36 are illustrated.

Figure 5A:
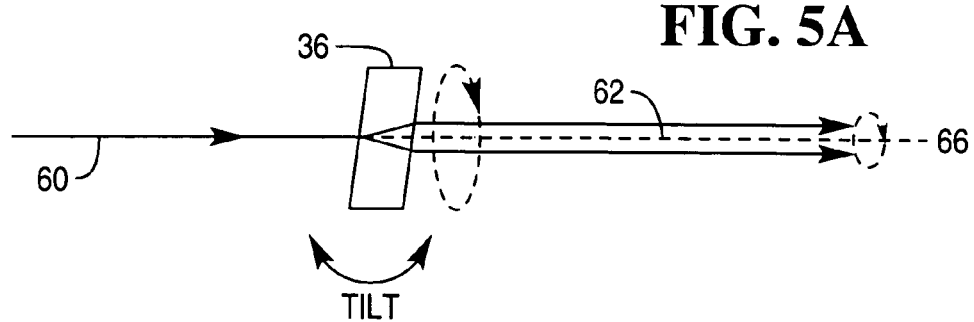
FIGS. 5A–5D are diagrammatic views illustrating operation of various types of laser beam oscillating elements.

FIG. 5A illustrates a flat refractive window element. This type of optical element produces translation of laser beam 60 through tilting of the refractive window element, and rotation of laser beam 60 through tilting and rotation of the refractive window element.

Figure 5B:
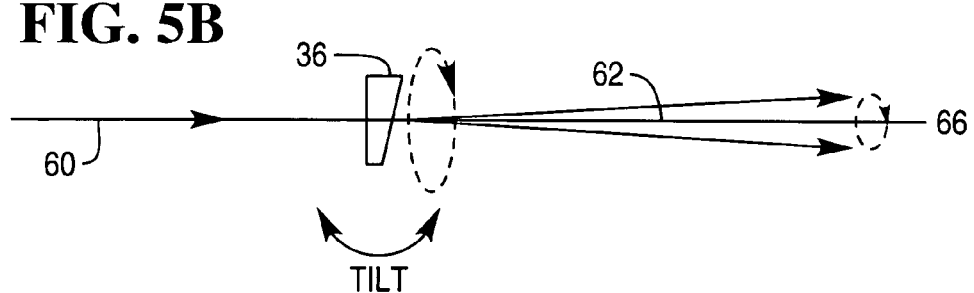

FIG. 5B illustrates a refractive wedge window element. This type of optical element produces a tilt and rotation of laser beam 60 about the unoscillated beam path 66 through rotation of the refractive wedge window element.

Figure 5C:
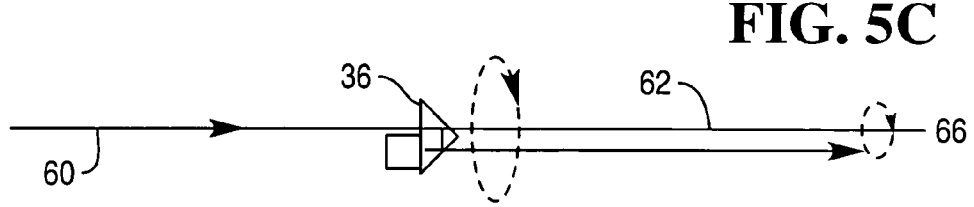

FIG. 5C illustrates a prism element. This type of optical element produces a rotation of laser beam 60 about the unoscillated beam path 66 through rotation of the prism element.

Figure 5D:
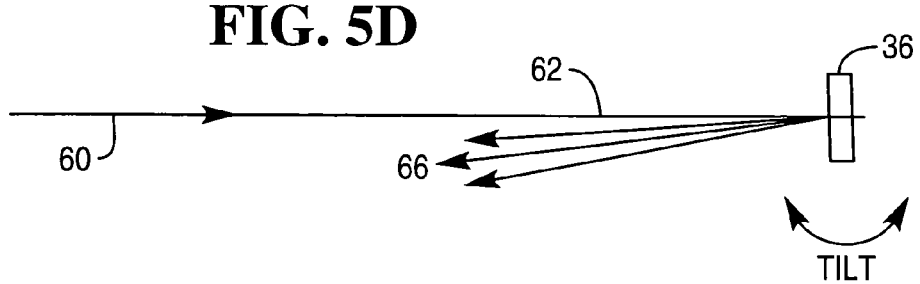

FIG. 5D illustrates a flat mirror element. This type of optical element reflects laser beam 60 to produce a tilt and rotation of laser beam 60 about the unoscillated beam path 66 through rotation of the mirror element.

Figure 6A:
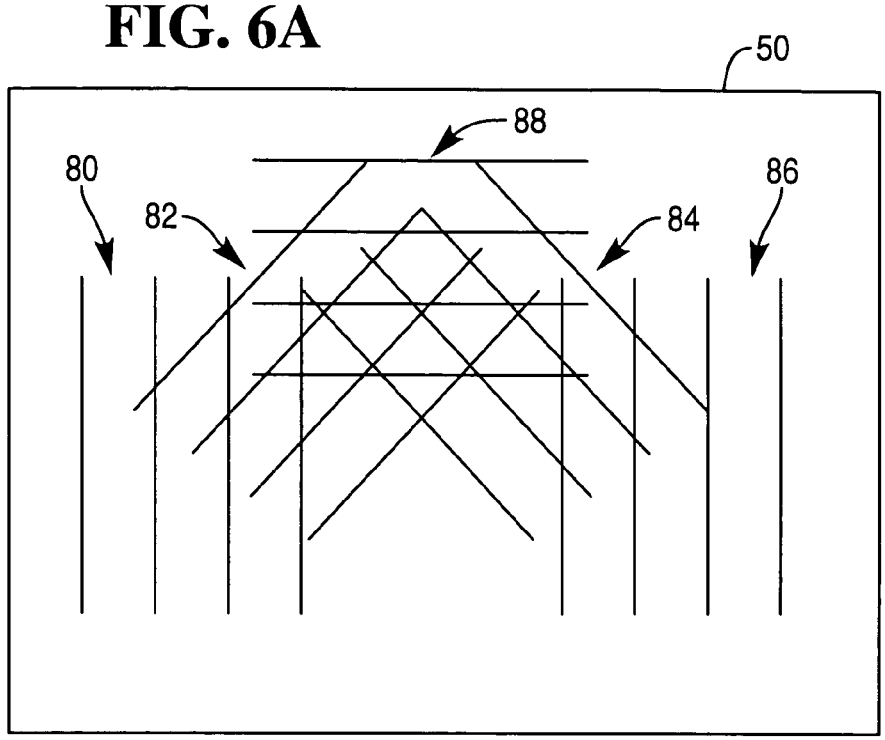
FIGS. 6A and 6B illustrate the difference between a stationary scan pattern and a scan pattern having a laser beam oscillator.
Figure 6B:
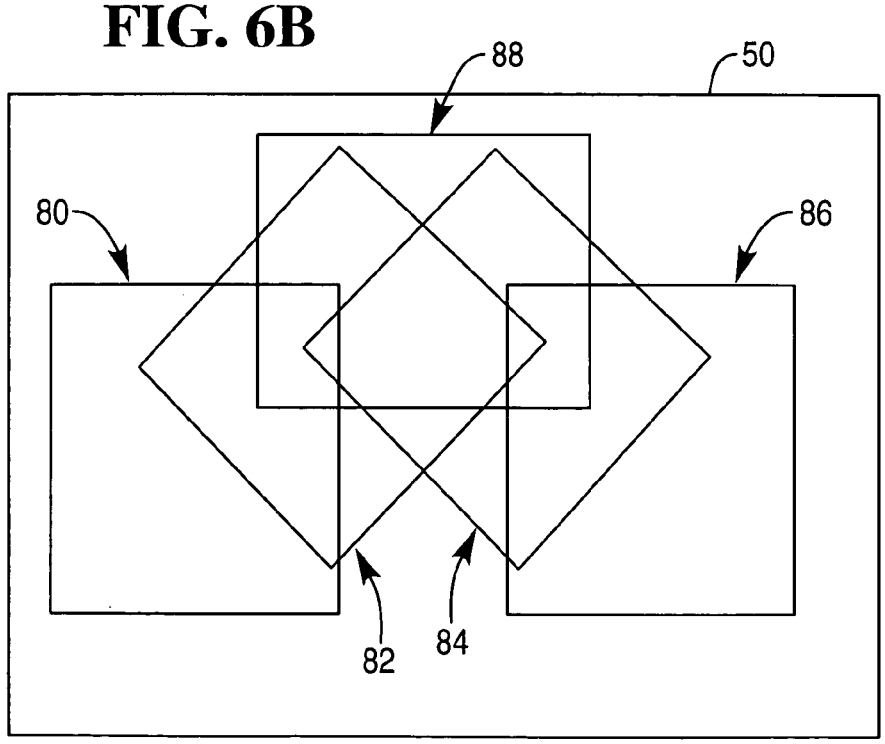

Turning now to FIGS. 6A and 6B, the difference in area coverage of exit window 50 is illustrated. Area coverage is related to pattern density and ease of detecting and decoding bar code label 32.

With reference to FIG. 6A, five groups of scan lines 82–88 in an example scan pattern each contain four scan lines. The four scan lines are produced by a mirrored spinner 16 having four planoreflective surfaces oriented at different angles.

With reference to FIG. 6B, the scan lines in the same five groups of scan lines 82–88 are made to oscillate by laser beam oscillator 14. Oscillation provides greater scan line coverage. A large enough amplitude can cause oscillating scan lines to overlap, resulting in a dramatic increase in scan line coverage of window 50. In more complex scan patterns containing many more groups of scan lines, a higher percentage of window 50 may be covered.

Although the invention has been described with particular reference to certain preferred embodiments thereof, variations and modifications of the present invention can be effected within the spirit and scope of the following claims.

What is claimed is:

1. A bar code scanner comprising:
   a laser for producing a laser beam;
   a mirrored spinner; and
   a laser beam oscillator optically located between the laser and the mirrored spinner for continuously deflecting the laser beam from an undeflected path of the laser beam and for continuously rotating the laser beam around the undeflected path.

2. The bar code scanner of claim 1, wherein the laser beam oscillator comprises:
   an optical element; and
   an oscillator coupled to the optical element.

3. The bar code scanner of claim 2, wherein the optical element comprises:
   a flat refractive window element which rotates to produce a rotation of the laser beam around the undeflected path and a translation of the laser beam from the undeflected path.

4. The bar code scanner of claim 2, wherein the optical element comprises:
   a refractive wedge window element which rotates to produce a rotation of the laser beam around the undeflected path and an angular deflection of the laser beam from the undeflected path.

5. The bar code scanner of claim 2, wherein the optical element comprises:
   a prism element which rotates to produce a rotation of the laser beam around the undeflected path and a translation of the laser beam from the undeflected path.

6. The bar code scanner of claim 2, wherein the optical element comprises:
   a flat mirror element which rotates and reflects the laser beam to produce a rotation of the laser beam around the undeflected path and an angular deflection of the laser beam from the undeflected path.

7. The bar code scanner of claim 2, wherein the oscillator comprises a motor.

8. The bar code scanner of claim 2, wherein the oscillator comprises a propeller driven by windage from a motor that rotates the mirrored spinner.

9. The bar code scanner of claim 2, wherein the oscillator comprises a piezoelectric device.

10. The bar code scanner of claim 2, wherein the oscillator comprises a galvanometer.

11. The bar code scanner of claim 2, wherein the oscillator comprises an acousto-optical beam deflector.

12. The bar code scanner of claim 2, wherein the oscillator comprises a voice coil.

13. The bar code scanner of claim 1, wherein the laser beam oscillator rasters the laser beam around the undeflected path to produce an infinite number of scan lines about an original stationary scan line.

14. The bar code scanner of claim 1, further comprising:
    a plurality of pattern mirrors for producing scan lines from a deflected laser beam from the mirrored spinner.

15. A bar code scanner comprising:
    a laser for producing a laser beam;
    a mirrored spinner;
    a laser beam oscillator optically located between the laser and the mirrored spinner for continuously deflecting the laser beam from an undeflected path of the laser beam and for continuously rotating the laser beam around the undeflected path, including
    an optical element; and
    an oscillator coupled to the optical element; and
    a plurality of pattern mirrors for producing scan lines from a deflected laser beam from the mirrored spinner;
    wherein the laser beam oscillator continuously deflects the laser beam from the undeflected path to produce an infinite number of scan lines about an original stationary scan line.

16. A scanning method comprising the steps of:
    producing a laser beam by a laser;
    rotating an optical element about an undeflected path of the laser beam;
    continuously deflecting the laser beam from the undeflected path by the optical element;
    continuously rotating the laser beam around the undeflected path by the optical element;
    directing deflected laser beams to a plurality of pattern mirrors by a mirrored spinner; and
    directed the deflected laser beams through a scanning aperture to produce a plurality of groups of scan lines containing the deflected laser beams.

17. A bar code scanner comprising:
a laser for producing a laser beam;
a mirrored spinner; and
a laser beam oscillator optically located between the laser and the mirrored spinner and having an axis of rotation along an undeflected path of the laser beam for continuously deflecting the laser beam from the undeflected path.

18. A bar code scanner comprising:
a laser for producing a laser beam;
a mirrored spinner;
a laser beam oscillator optically located between the laser and the mirrored spinner and having an axis of rotation substantially along an undeflected path of the laser beam for continuously deflecting the laser beam from the undeflected path, including
an optical element; and
an oscillator coupled to the optical element; and
a plurality of pattern mirrors for producing scan lines from a deflected laser beam from the mirrored spinner;
wherein the laser beam oscillator continuously deflects the laser beam from the undeflected path to produce an infinite number of scan lines about an original stationary scan line.

19. A scanning method comprising the steps of:
producing a laser beam by a laser;
rotating an optical element having an axis of rotation substantially along an undeflected path of the laser beam;
continuously deflecting the laser beam from the undeflected path by the optical element;
directing deflected laser beams to a plurality of pattern mirrors by a mirrored spinner; and
directed the deflected laser beams through a scanning aperture to produce a plurality of groups of scan lines containing the deflected laser beams.

20. A bar code scanner comprising:
a laser for producing a laser beam;
a mirrored spinner;
an optical element optically located between the laser and the mirrored spinner; and
a motor for rotating the optical element;
wherein the optical element continuously deflects the laser bean from an undeflected path of the laser beam, continuously rotates the laser beam around the undeflected path, and rasters the laser beam as the laser beam rotates around the undeflected path.

* * * * *